US 6,602,626 B1

(12) United States Patent  
Allen

(10) Patent No.: US 6,602,626 B1  
(45) Date of Patent: Aug. 5, 2003

(54) FUEL CELL WITH INTERNAL THERMALLY INTEGRATED AUTOTHERMAL REFORMER

(75) Inventor: Jeffrey P. Allen, Naugatuck, CT (US)

(73) Assignee: GenCell Corporation, Southbury, CT (US)

( * ) Notice: Subject to any disclaimer, the term of this patent is extended or adjusted under 35 U.S.C. 154(b) by 160 days.

(21) Appl. No.: 09/785,594

(22) Filed: Feb. 16, 2001

Related U.S. Application Data

(60) Provisional application No. 60/182,828, filed on Feb. 16, 2000.

(51) Int. Cl.[7] ............... H01M 8/04; H01M 8/18; H01M 8/10
(52) U.S. Cl. .................. 429/20; 429/17; 429/19; 429/31
(58) Field of Search .................. 429/12, 13, 17, 429/19, 20, 31, 32, 34, 35, 38

(56) References Cited

U.S. PATENT DOCUMENTS

| | | | |
|---|---|---|---|
| 3,488,226 A | 1/1970 | Baker et al. ................. 136/86 |
| 4,169,917 A | 10/1979 | Baker et al. ................. 429/26 |
| 4,175,165 A | 11/1979 | Adlhart ....................... 429/30 |
| 4,182,795 A | 1/1980 | Baker et al. ................. 429/13 |
| 4,200,682 A | 4/1980 | Sederquist .................. 429/17 |
| 4,365,007 A | 12/1982 | Maru et al. .................. 429/19 |
| 4,476,197 A | 10/1984 | Herceg ....................... 429/32 |
| 4,510,212 A | 4/1985 | Fraioli ........................ 429/30 |
| 4,548,876 A | 10/1985 | Bregoli ....................... 429/38 |
| 4,604,331 A | 8/1986 | Louis .......................... 429/35 |
| 4,631,239 A | 12/1986 | Spurrier et al. .............. 429/39 |
| 4,702,973 A | 10/1987 | Marianowski ............... 429/41 |
| 4,753,857 A | 6/1988 | Hosaka ....................... 429/38 |
| 4,781,996 A | 11/1988 | Toriya et al. ................ 429/36 |
| 4,853,301 A | 8/1989 | Granata, Jr. et al. .......... 429/39 |
| 4,857,420 A | 8/1989 | Maricle et al. .............. 429/30 |
| 4,902,586 A | 2/1990 | Wertheim ................... 429/20 |
| 4,977,041 A | 12/1990 | Shiozawa et al. ............ 429/26 |
| 4,978,589 A | 12/1990 | Shiozawa et al. ............ 429/26 |
| 4,983,472 A | 1/1991 | Katz et al. .................. 429/38 |
| 5,079,105 A | 1/1992 | Bossel ......................... 429/19 |
| 5,084,364 A | 1/1992 | Quaadvliet .................. 429/34 |
| 5,227,256 A | 7/1993 | Marianowski et al. ....... 429/16 |
| 5,298,342 A | 3/1994 | Laurens et al. .............. 429/35 |
| 5,362,578 A | 11/1994 | Petri et al. ................... 429/35 |
| 5,366,819 A | 11/1994 | Hartvigsen et al. .......... 429/17 |
| 5,399,442 A * | 3/1995 | Shundo ....................... 429/32 |
| 5,424,144 A | 6/1995 | Woods, Jr. .................. 429/35 |
| 5,458,857 A | 10/1995 | Collins et al. ............... 422/198 |
| 5,460,897 A | 10/1995 | Gibson et al. ............... 429/39 |
| 5,482,792 A | 1/1996 | Faita et al. .................. 429/30 |
| 5,503,945 A | 4/1996 | Petri et al. ................... 429/35 |
| 5,527,363 A | 6/1996 | Wilkinson et al. .......... 29/623.1 |
| 5,527,634 A * | 6/1996 | Meacham ................... 429/35 |

(List continued on next page.)

FOREIGN PATENT DOCUMENTS

| | | |
|---|---|---|
| DE | 4206490 | 9/1993 |
| JP | 61024158 | 2/1986 |
| WO | WO 98/21773 | 5/1998 |

OTHER PUBLICATIONS

Toshihiko, "Flat Solid Electrolyte Fuel Cell," abstract of patent No. 07022038, *Patent Abstracts of Japan* (1995).

Primary Examiner—Randy Gulakowski  
Assistant Examiner—Donald V. Scaltrito  
(74) Attorney, Agent, or Firm—Banner & Witcoff, Ltd.

(57) ABSTRACT

An apparatus for auto thermal reforming hydrocarbon fuel in a fuel cell stack includes a plurality of fuel cells stacked together. Each fuel cell has an inlet manifold, and the inlet manifolds of the fuel cells are aligned with one another to form a manifold chamber. A porous wand extends through the manifold. A mixing device is positioned within the wand and is configured to carry fuel gas and oxidant through the wand.

22 Claims, 5 Drawing Sheets

U.S. PATENT DOCUMENTS

| | | | |
|---|---|---|---|
| 5,543,240 A * | 8/1996 | Lee et al. | 429/38 |
| 5,558,955 A | 9/1996 | Breault et al. | 429/38 |
| 5,616,431 A * | 4/1997 | Kusunoki et al. | 429/36 |
| 5,707,755 A | 1/1998 | Grot | 429/40 |
| 5,726,105 A | 3/1998 | Grasso et al. | 442/326 |
| 5,733,682 A | 3/1998 | Quadakkers et al. | 429/210 |
| 5,770,327 A | 6/1998 | Barnett et al. | 429/32 |
| 5,773,160 A | 6/1998 | Wilkinson et al. | 429/13 |
| 5,773,161 A | 6/1998 | Farooque et al. | 429/34 |
| 5,776,624 A | 7/1998 | Neutzler | 429/26 |
| 5,795,665 A | 8/1998 | Allen | 429/12 |
| 5,798,187 A | 8/1998 | Wilson et al. | 429/26 |
| 5,798,188 A | 8/1998 | Mukohyama et al. | 429/34 |
| 5,811,202 A | 9/1998 | Petraglia | 429/35 |
| 5,833,822 A | 11/1998 | Hsu | 204/270 |
| 5,846,668 A | 12/1998 | Watanabe | 429/32 |
| 5,922,485 A | 7/1999 | Enami | 429/26 |
| 5,942,349 A | 8/1999 | Badwal et al. | 429/34 |
| 5,993,619 A | 11/1999 | Bloomsfield et al. | 204/242 |
| 5,997,594 A | 12/1999 | Edlund et al. | 48/76 |
| 6,017,648 A * | 1/2000 | Jones | 429/35 |
| 6,025,403 A * | 2/2000 | Marler et al. | 518/703 |
| 6,033,794 A | 3/2000 | George et al. | 429/24 |
| 6,037,073 A | 3/2000 | Besmann et al. | 429/34 |
| 6,040,073 A | 3/2000 | Okamoto | 429/26 |
| 6,040,075 A | 3/2000 | Adcock et al. | 429/32 |
| 6,040,076 A | 3/2000 | Reeder | 429/35 |
| 6,045,934 A | 4/2000 | Enami | 429/30 |
| 6,045,935 A | 4/2000 | Ketcham et al. | 429/30 |
| 6,048,633 A | 4/2000 | Fujii et al. | 429/32 |
| 6,048,634 A | 4/2000 | Kaufman et al. | 429/34 |
| 6,048,636 A | 4/2000 | Naoumidis et al. | 429/44 |
| 6,050,331 A | 4/2000 | Breault et al. | 165/168 |
| 6,051,330 A | 4/2000 | Fasano et al. | 429/30 |
| 6,051,331 A * | 4/2000 | Spear et al. | 429/34 |
| 6,054,228 A | 4/2000 | Cisar et al. | 429/18 |
| 6,054,231 A | 4/2000 | Virkar et al. | 429/34 |
| 6,071,635 A | 6/2000 | Carlstrom, Jr. | 429/34 |
| 6,071,636 A | 6/2000 | Mosdale | 429/34 |
| 6,074,692 A | 6/2000 | Hulett | 427/115 |
| 6,080,502 A | 6/2000 | Nölscher et al. | 429/34 |
| 6,096,450 A | 8/2000 | Walsh | 429/34 |
| 6,099,984 A | 8/2000 | Rock | 429/39 |
| 6,103,415 A | 8/2000 | Kurita et al. | 429/34 |
| 6,117,580 A | 9/2000 | Nitschké et al. | 429/34 |
| 6,124,053 A * | 9/2000 | Bernard et al. | 429/34 |
| 6,291,089 B1 * | 9/2001 | Piascik et al. | 429/17 |
| 6,361,892 B1 * | 3/2002 | Ruhl et al. | 429/30 |
| 6,444,339 B1 * | 9/2002 | Eshraghi | 429/26 |

* cited by examiner

FUEL CELL WITH INTERNAL THERMALLY INTEGRATED AUTOTHERMAL REFORMER

CROSS-REFERENCE TO RELATED APPLICATIONS

This application claims priority to U.S. Provisional Patent Application No. 60/182,828, filed Feb. 16, 2000.

INTRODUCTION

The invention relates to high temperature fuel cells and, more particularly, to fuel cells having internal catalytic auto thermal reforming of fuel.

BACKGROUND OF THE INVENTION

An electrochemical fuel cell converts the chemical bond energy potential of fuel to electrical energy in the form of direct current (DC) electricity. Fuel cells are presently being considered as replacement for battery storage systems and conventional electric generating equipment.

A fuel cell stack is comprised of a plurality of individual fuel cells stacked together and arranged in an electrical series relationship to produce higher useable DC voltage. A DC/AC inverter may be utilized to convert the DC electrical current to AC electrical current for use in common electrical equipment.

A fuel cell stack formed of Molten Carbonate Fuel Cells (MCFC's) typically operates at about 650° C. This high temperature provides the opportunity for the fuel cell stack to operate at high efficiency using a variety of hydrocarbon-based fuel feed stocks.

All fuel cells utilize diatomic hydrogen in an electrochemical fuel cell reaction. The hydrogen may be derived from a variety of hydrocarbon-based fuel feed stocks, such as methane and methanol. The derivation of hydrogen from hydrocarbon-based fuel feed stock is achieved by the process of reforming. Reforming of hydrocarbon fuels may be achieved by several means. Catalytic Steam Reforming (CSR), Catalytic Partial Oxidation (CPOX) reforming, and Catalytic Auto Thermal Reforming (CATR) are widely known in the art as methods used to reform hydrocarbon fuel. CATR is known as the coupling of CSR with CPOX. CATR has been further defined as a CSR reaction and a CPOX reaction that occur over microscopic distances at a common catalytic site, thus avoiding complex heat exchange. CATR has further been defined in the art as occurring when there is no wall between a combined CSR reaction and a catalyzed CPOX reaction.

It is desirable to strive for 100% conversion of the fuel feed stock in the reforming process. Since un-converted fuel feed stock will not react with the anode electrode of an MCFC stack, full conversion avoids the passage of non-useable fuel feed stock through the fuel cell. Passage of unconverted fuel feed stock through the fuel cell, therefore, has the effect of diminishing the efficiency of the fuel cell through under-utilization of the fuel feed stock. Carbon monoxide produced in the reforming process is useable as a fuel in an MCFC stack.

It is well known in the art that the method of internally reforming methane fuel feed stock within an MCFC, as taught by U.S. Pat. Nos. 3,488,226 and 4,182,795, to Baker et al., couples the exothermic fuel cell reaction with the endothermic stream reforming reaction. This method has become known in the art as Direct Internal Reforming (DIR).

However, DIR reforming of fuel in an MCFC stack presents significant difficulties. For example, a typical method of DIR utilizes a nickel catalyst on a magnesium oxide substrate in pelletized form. This form of catalyst is loaded into the anode flow chamber of the active area of the fuel cell. The nickel catalyst on the surface of the pellets possesses an extremely high surface area. The electrolyte of a carbonate fuel cell is highly mobile through both surface creepage as well as evaporation into the gas stream. This mobile electrolyte contaminates the nickel on the surface of the pellet, and, therefore, the high surface area nickel catalyst rapidly becomes non-functional. This results in excessive quantities of non-reformed fuel feed stock slipping past the catalyst and exiting the fuel cell without having been utilized in the fuel cell reaction, thereby diminishing the fuel efficiency of the fuel cell. This decay of the reforming catalyst typically will occur sooner than that of other components within the fuel cell, and results in premature failure of the fuel cell system.

Another technique applied to internal reforming of fuel gas within a carbonate fuel cell utilizes a separate chamber for the catalyst, as taught by the Baker et al. patents, as well as U.S. Pat. No. 5,175,062 to Farooque et al. This method, known as Indirect Internal Reforming (IIR), is effective in avoidance of electrolyte contamination but fails to achieve the beneficial effects of the close coupling of endothermic/exothermic reactions that occurs in direct internal reforming. The fuel gas cannot achieve 100% reforming conversion within the IIR chamber of an MCFC operating at 650° C. Typically, the partially reformed fuel is polished using a DIR catalyst that remains subject to electrolyte contamination and premature failure.

Reforming of fuel feed stock external to the fuel cell stack may take many forms. U.S. Pat. No. 4,902,586 to Werthiem teaches an Auto Thermal Reformer (ATR) for an MCFC, external to the confines of the fuel cell, that utilizes the cathode exhaust as the source of oxidant for the combustion reaction in the ATR. However, it is known that high temperature fuel cells such as MCFC's benefit from the close coupling of the exothermic and endothermic reactions of the fuel cell and reformer. For example, U.S. Pat. No. 5,366,819 to Hartvigsen et al. teaches an ATR thermally integrated within the confines of the insulated walls of a high temperature Solid Oxide Fuel Cell (SOFC). U.S. Pat. No. 5,079,105 to Bossel teaches the application of a reforming device centrally located within an arrangement of four fuel cell stacks. Heat is transferred to the reforming device by the recirculation of gaseous media and the radiated Joule heat accumulating in the fuel cell by ohmic losses.

It is an object of the present invention to provide a fuel cell having an internal thermally integrated autothermal reformer that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

Accordingly, it is seen as desirable to provide an improved MCFC system that utilizes a Catalytic Auto Thermal Reformer (CATR) that is internally positioned within the fuel cell stack and is thermally integrated to improve the efficiency of the CATR process by reducing the quantity of oxygen required to elevate and maintain the operational temperature of the CATR.

In accordance with a first aspect, an apparatus for auto thermal reforming hydrocarbon fuel in a fuel cell stack includes a plurality of fuel cells stacked together. Each fuel cell has an inlet manifold, and the inlet manifolds of the fuel cells are aligned with one another to form a manifold chamber. A porous wand is positioned within the manifold chamber. A mixing device is positioned within the wand and is configured to carry a fuel gas and an oxidant through the wand.

In accordance with another aspect, an apparatus for reforming hydrocarbon fuel in a fuel cell stack includes a plurality of fuel cells stacked together. Each fuel cell includes a bipolar separator plate having an inlet manifold and an outlet manifold. The inlet manifolds of the fuel cells in the stack are aligned with one another to form a manifold chamber. A tubular porous wand is positioned in the manifold chamber. A mixing device is positioned within the wand and has a first passageway configured to carry a fuel gas and a second passageway configured to carry an oxidant. A catalyst is deposited on the porous wand to promote reforming of a fuel gas.

In accordance with yet another aspect, an apparatus for reforming hydrocarbon fuel in a fuel cell stack includes a plurality of fuel cells stacked together. Each fuel cell includes an anode electrode, a cathode electrode, an electrolyte matrix, and a bipolar separator plate having an inlet manifold and an outlet manifold. The inlet manifolds of the fuel cells in the stack are aligned with one another to form a manifold chamber. A tubular porous wand is positioned in the manifold chamber. A mixing device includes a tubular member having an internal wall defining a first passage configured to carry a fuel gas and a second passage configured to carry an oxidant. A catalyst is deposited on the porous wand to promote catalytic auto thermal reforming of a fuel gas From the foregoing disclosure, it will be readily apparent to those skilled in the art, that is, those who are knowledgeable or experienced in this area of technology, that the present invention provides a significant advance. Preferred embodiments of the present invention can provide improved reforming of fuel feed stock and improved fuel cell efficiencies. These and additional features and advantages of the invention disclosed here will be further understood from the following detailed disclosure of preferred embodiments.

BRIEF DESCRIPTION OF THE DRAWINGS

Preferred embodiments are described in detail below with reference to the appended drawings.

Figure 1:
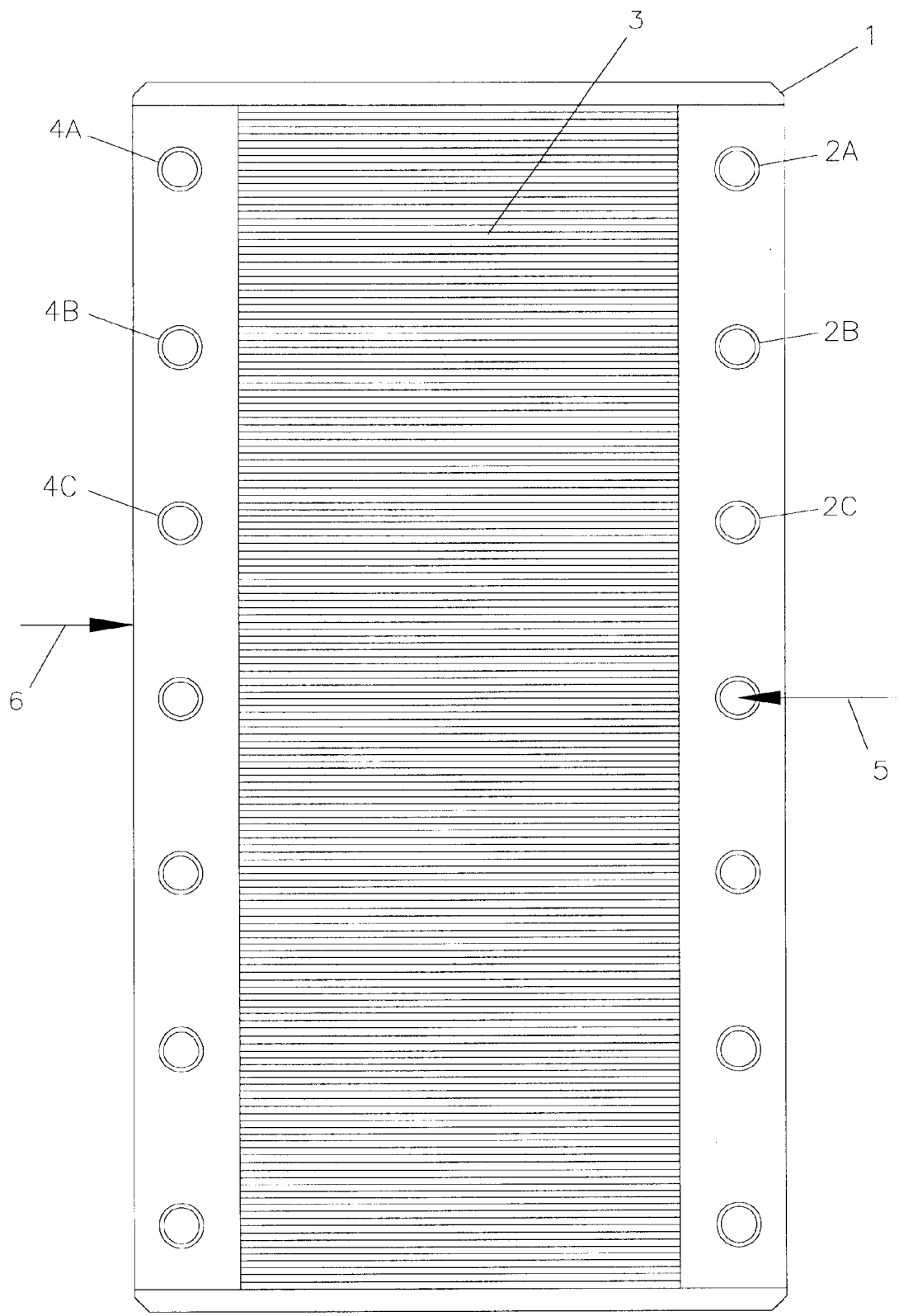
FIG. 1 illustrates a plan view of a separator plate of a fuel cell.
Figure 2:
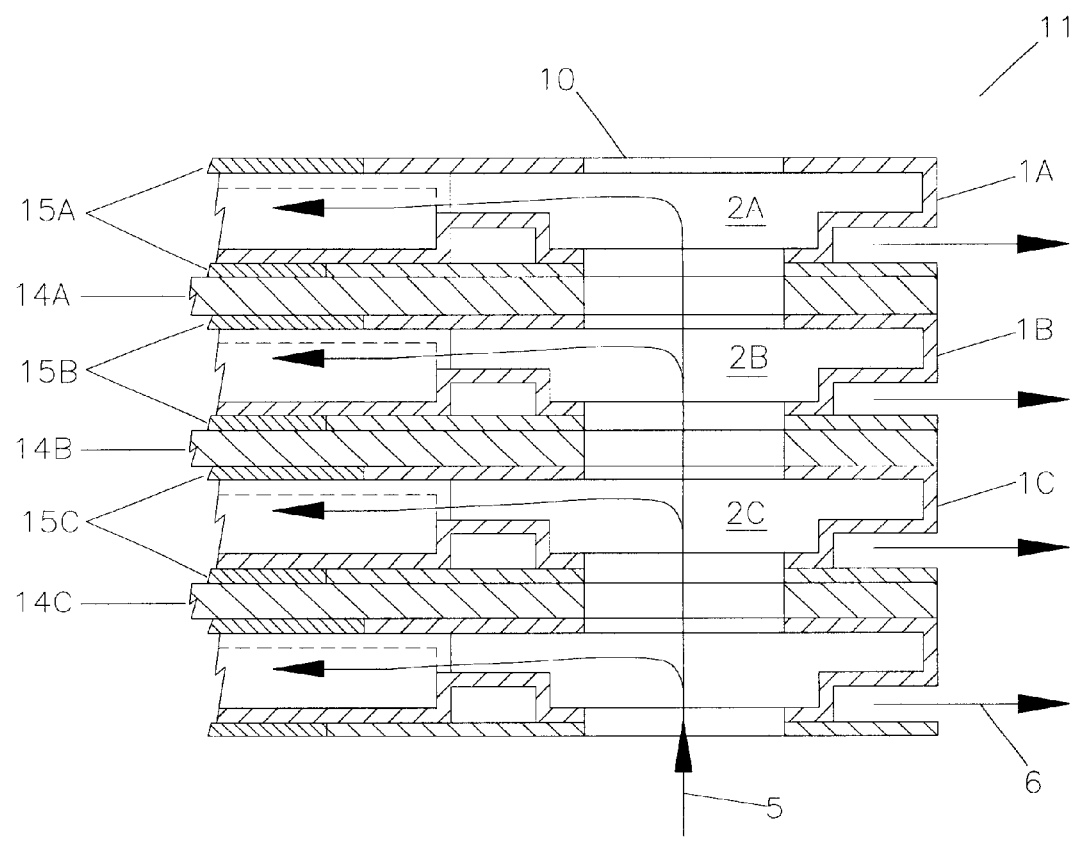
FIG. 2 illustrates a cross-section of an internal fuel manifold of a fuel cell stack.

The figures referred to above are not drawn necessarily to scale and should be understood to present a representation of the invention, illustrative of the principles involved. Some features of the fuel cell with an internal autothermal reformer depicted in the drawings have been enlarged or distorted relative to others to facilitate explanation and understanding. The same reference numbers are used in the drawings for similar or identical components and features shown in various alternative embodiments. Fuel cells with autothermal reformers, as disclosed herein, will have configurations and components determined, in part, by the intended application and environment in which they are used.

DETAILED DESCRIPTION OF THE INVENTION

MCFC stacks are formed of a plurality of individual fuel cell sub-assemblies stacked together to provide a series DC relationship. Each individual sub-assembly includes an anode electrode, a cathode electrode, and an electrolyte held within a porous ceramic sheet known as an electrolyte matrix. What is known in the art as a bipolar separator plate, or a flow field, separates adjacent individual sub-assemblies. Related Non-provisional U.S. patent application Ser. No. 09/714,526, filed Nov. 16$^{th}$, 2000, and entitled "Fuel Cell Bipolar Separator Plate and Current Collector and Method of Manufacture" describes a bipolar separator plate suitable for use with the MCFC stack of the present invention, and is incorporated in its entirety herein by reference. Such a bipolar separator plate utilizes what is known in the art as an internal fuel manifold. When bipolar separator plates utilizing internal fuel manifolds are stacked in series relationship, a manifold chamber, typically vertically oriented, is created by adjoining fuel manifolds for the purpose of distributing and collecting the reactant fuel.

Under typical operational conditions of an MCFC stack utilizing separator plates and counter-current flow of reactant gasses, the ambient temperature of the fuel gas within the vertical chamber is quite high. The radiant heat of the interior walls of the manifold chamber heat the fuel gas. The opposite, or outer, side of the walls of the manifold chamber are constantly awash with and immersed in the exhausting oxidant gas that typically may exit the fuel cell stack at temperatures exceeding 650° C. The heat present within the exhausting oxidant gas is transferred to the incoming fuel gas within the manifold chamber. Thus, the manifold chamber acts as a heat exchanger between the oxidant gas and the fuel gas. The fuel feed stock may achieve temperatures exceeding 500° C. within the confines of the manifold chamber prior to entry into the bipolar separator plates of the stack.

FIG. 1 shows the anode side of a bipolar separator plate 1 of a carbonate electrolyte fuel cell. The separator 1 is equipped with a plurality of internal fuel inlet manifolds 2A, 2B, 2C, . . . in fluid communication with an active area 3 of the separator 1. Separator plate 1 is further fitted with a plurality of internal fuel outlet manifolds 4A, 4B, 4C, . . . , also in fluid communication with active area 3 of separator plate 1. Fuel gas 5 enters internal fuel inlet manifolds 2A, 2B, 2C, . . . and accesses active area 3 to react in known fashion with an electrode (not shown) in active area 3 of an assembled fuel cell. The spent fuel gas exits separator plate 1 via the internal fuel outlet manifolds 4A, 4B, 4C, . . . .

Oxidant gas 6 enters the fuel cell via an open edge of separator plate 1, and accesses active area 3 on the opposing face of separator plate 1. Spent oxidant gas exits separator plate 1 via opposing open edges of the separator plate. In the illustrated embodiment, the fuel gas 5 and oxidant gas 6 traverse separator plate 1 in a counter-flow or counter-current manner.

Fuel cell stack 11 includes a plurality of separator plates 1A, 1B, 1C, . . . , electrodes 15A, 15B, 15C, . . . , and electrolyte matrices 14A, 14B, 14C, . . . . Each separator plate 1A, 1B, 1C, . . . has an internal fuel inlet manifold 2A, 2B, 2C, . . . . The fuel inlet manifolds 2A, 2B, 2C, . . . of the fuel cells in the stack are aligned to form a manifold chamber 10. The manifold chamber is generally substantially perpendicular to planes defined by the separator plates. Fuel gas 5 enters manifold chamber 10 and accesses the plurality of separator plates 1A, 1B, 1C, . . . . In a preferred embodiment, fuel gas 5 is introduced to manifold chamber 10 at the ends of the fuel stack via piping or ducting (not shown). Oxidant gas 6 exits the plurality of separator plates 1A, 1B, 1C, . . . via the open edges of the separator plates. As noted above, in this preferred embodiment, fuel gas 5 and oxidant gas 6 are flowing counter-current to one another.

Figure 3:
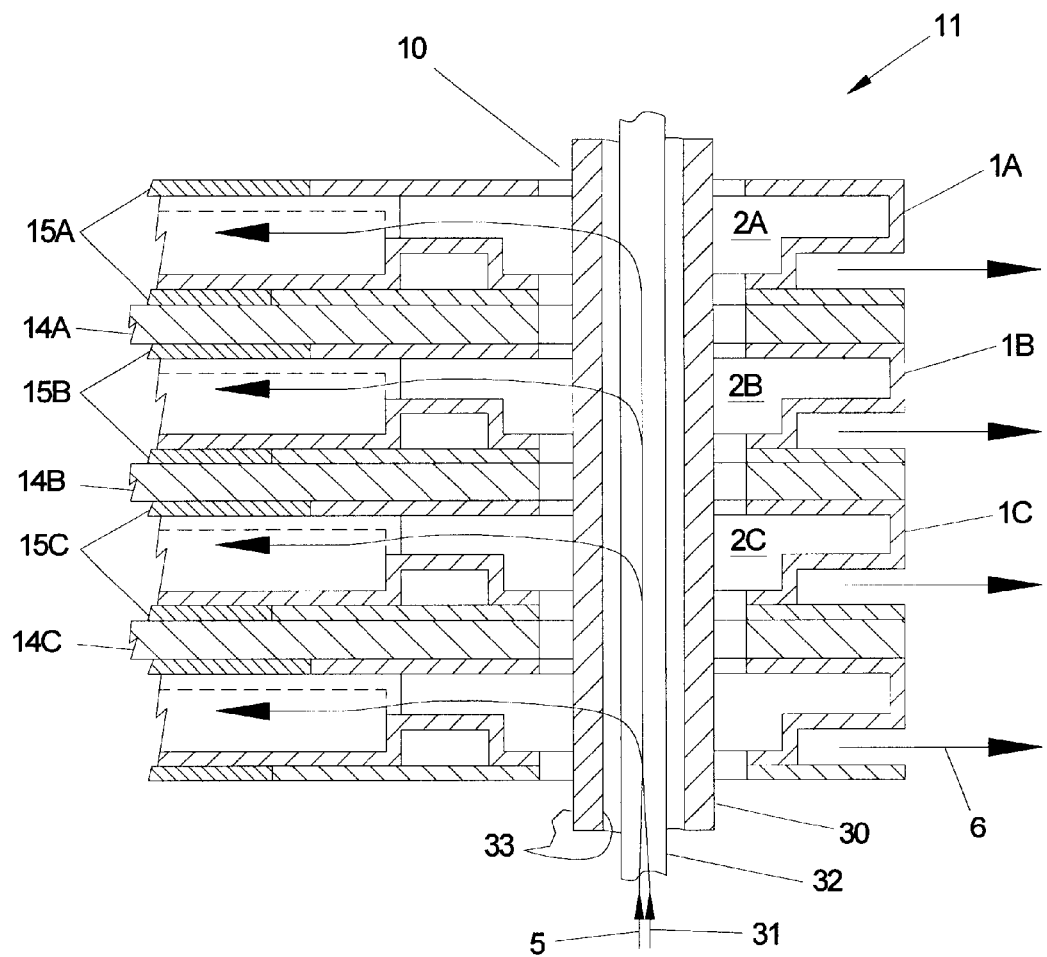
FIG. 3 illustrates a catalytic auto thermal reforming wand extending through the internal fuel manifold of FIG. 2.

As seen in FIG. 3, a porous catalytic auto thermal reforming wand 30 is positioned within manifold chamber. A wand, as used herein, refers to a conduit, pipe, or tube-like member into which fuel gas and oxidant can flow. Wand 30 is porous such that fuel gas 5 and oxidant 31 can pass through the wall of wand 30. Wand 30 is preferably a cylindrical tubular member. In certain preferred embodiments, wand 30 is formed of a non-conductive material. In especially preferred embodiments, wand 30 is formed of a ceramic, and most preferably is formed of ceramic alumina. It is to be appreciated that other shapes and materials for wand 30 are considered to be within the scope of the invention, and such shapes and materials will become readily apparent to those skilled in the art, given the benefit of this disclosure.

Fuel gas 5 and oxidant 31 may be introduced into wand 30 via piping or ducting, not shown, at the ends of the assembled fuel cell stack 11. Fuel gas 5 and oxidant 31 are preferably uniformly distributed within the wand 30 via a mixing device 32. Fuel gas 5 and oxidant 31 catalytically auto thermal reform on the interior surface, and within the pores of, wand 30. The initiation of the catalytic auto thermal reforming process is aided by a catalyst 33 applied to the inside surface, and within the pores of, porous wand 30. Catalyst 33 may consist of any of the catalysts known in the art to affect the catalytic auto thermal reforming of the fuel gas and oxidant mixture, including, for example, platinum, palladium, nickel or ruthenium. The ratio of fuel gas 5 to oxidant 31 is regulated to result in partial oxidation of the fuel, and to release sufficient heat so as to raise the ambient temperature of the internal manifold and wand 30 from about 500° C. to above that temperature required to achieve complete conversion of the fuel feed stock. The gasses permeate the porous wall of the catalytic auto thermal reforming wand 30 and further react with catalyst 33 to reform the remaining fuel in the gas. Wand 30 is preferably removable from manifold chamber 10 for maintenance and replacement.

The CATR wand is provided with the appropriate quantity of hydrocarbon-based fuel feed stock, steam, and oxidant to achieve sufficient combustion and resultant release of heat energy to complete the reformation of the fuel feed stock. The auto thermal reformation of the fuel does consume a portion of the fuel and will, therefore, diminish the overall fuel efficiency of the fuel cell. However, the quantity of fuel needed to be combusted to elevate the temperature of the fuel feed stock from about 500° C. to above the temperature required to fully reform the fuel feed stock is considerably less than the amount of fuel gas which otherwise would be required to be combusted to elevate the temperature of the fuel feed stock from the ambient temperature that exists external to the fuel cell.

An internal wand for an MCFC stack may reform methane feed stock at temperatures known to result in near complete conversion of the methane. An internal wand for an MCFC may further utilize other fuel stocks such as methanol. It is known that methanol will reform to hydrogen and carbon dioxide at temperatures less than that required to reform methane. When methanol is delivered to the internal CATR wand of the MCFC stack, the quantity of oxidant required to combust the portion of fuel that results in the release of heat energy is reduced below that quantity required when methane is utilized as the fuel feed stock.

The source of the oxidant for the CATR may be derived from either the source of the cathode inlet oxidant or from the cathode outlet oxidant.

An internal CATR wand will not be subject to electrolyte contamination within the internal fuel inlet manifold when the combustion oxidant is sourced from the cathode inlet oxidant, since the gas stream has yet to accumulate electrolyte vapors.

Furthermore, an internal CATR wand will not be subject to electrolyte contamination within the internal fuel inlet manifold chamber when the combustion oxidant is sourced from the cathode outlet oxidant downstream from heat exchange with the cathode inlet oxidant. The oxidant inlet/outlet heat exchange precipitates entrained electrolyte vapors from the gas stream of the cathode outlet oxidant. Additionally, the wand is not in contact with the bipolar separator plates or the electrodes or electrolyte matrices.

Figure 4:
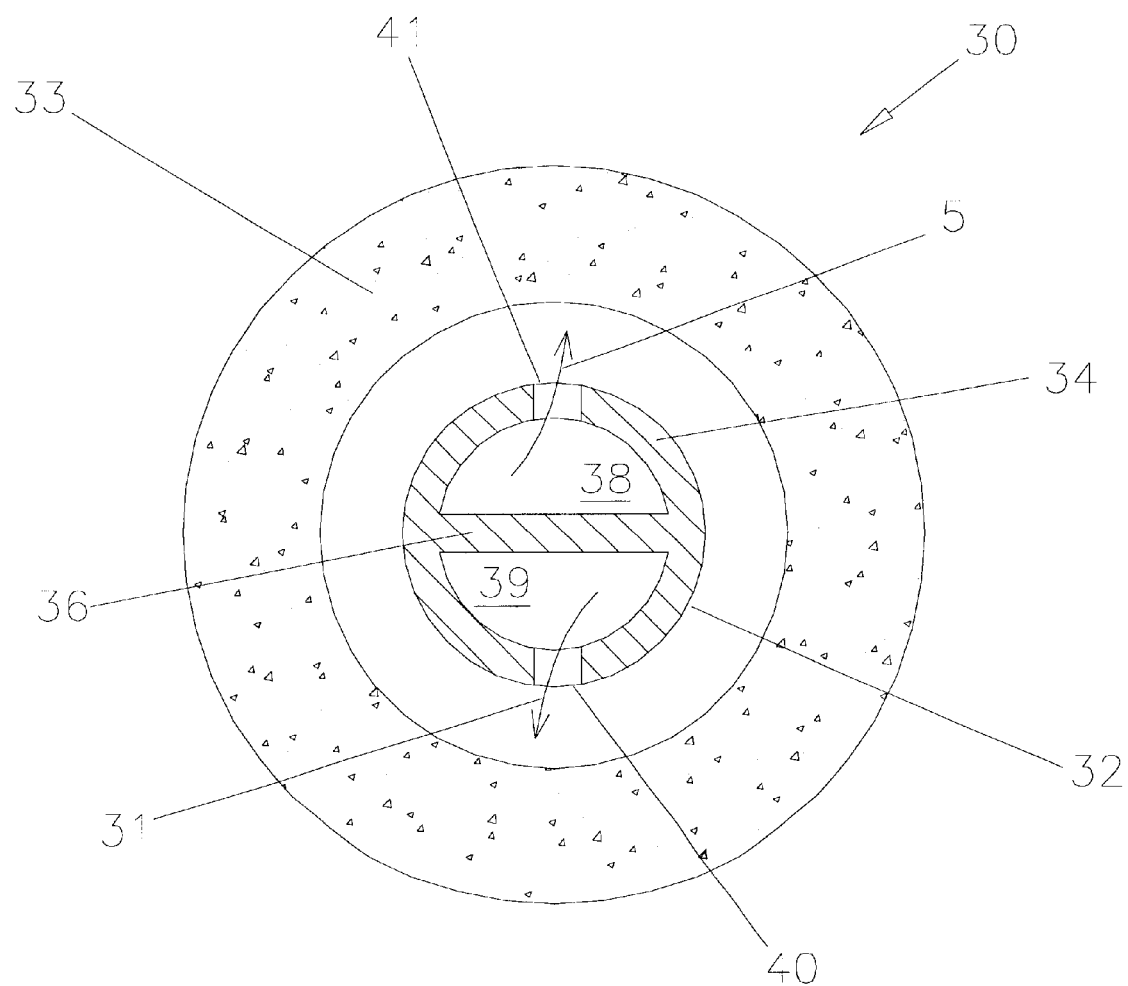
FIG. 4 illustrates a cross-section of the catalytic auto thermal reforming wand of FIG. 3.

A preferred embodiment of mixing device 32 is shown in FIG. 4. Mixing device 32 is formed of a cylindrical tube 34 having an internal wall 36 therein defining a first passage 38 and a second passage 39. Fuel gas 5 flows through first passage 38 and oxidant 31 flows through second passage 39. A plurality of oxidant orifices 40 are arranged axially along tube 34 to provide fluid communication between second passage 39 and the exterior of mixing device 32. A plurality of fuel orifices 41 are arranged axially along tube 34 to provide fluid communication between first passage 38 and the exterior of mixing device 32. Fuel gas 5 and oxidant 31 flow into first and second passages 38, 39, respectively, out through orifices 41, 40, respectively, and then through the pores of wand 30, reacting with catalyst 33. Orifices, 40, 41 promote uniform distribution and combustion of fuel gas 5 and oxidant 31 through wand 30 into manifold chamber 10.

Mixing device 32 may have other constructions suitable for the delivery of fuel gas 5 and oxidant 31. For example, mixing device 32 may be formed of two separate tubes having orifices formed therein. Mixing device 32 may have any other suitable construction that provides for delivery of the fuel gas 5 and oxidant 31 throughout the length of the interior of the porous catalytic auto thermal reforming wand 30. In this manner, thermal gradients within the wand will be minimized, thereby providing accurate control of the catalytic auto thermal reforming reaction prior to entry of the reformed fuel gas into the anode chambers of the fuel cell stack.

In certain preferred embodiments, fuel gas 5 and oxidant 31 may be fed into passages 38, 39, respectively, co-currently from a first end of mixing device 32, with mixing device 32 being capped at the opposing second end. Alternatively, mixing device 32 may be fed with fuel gas 5 and oxidant 31 co-currently from both ends of mixing device 32 simultaneously.

In other preferred embodiments, fuel gas 5 may be fed into passage 38 at a first end of mixing device 32, with the passage 38 being capped at the second end of mixing device 32, while oxidant 31 is fed into passage 39 at the second end of mixing device 32 with passage 39 being capped at the first end of mixing device 32, such that fuel gas 5 and oxidant 31 flow counter-currently.

Figure 5:
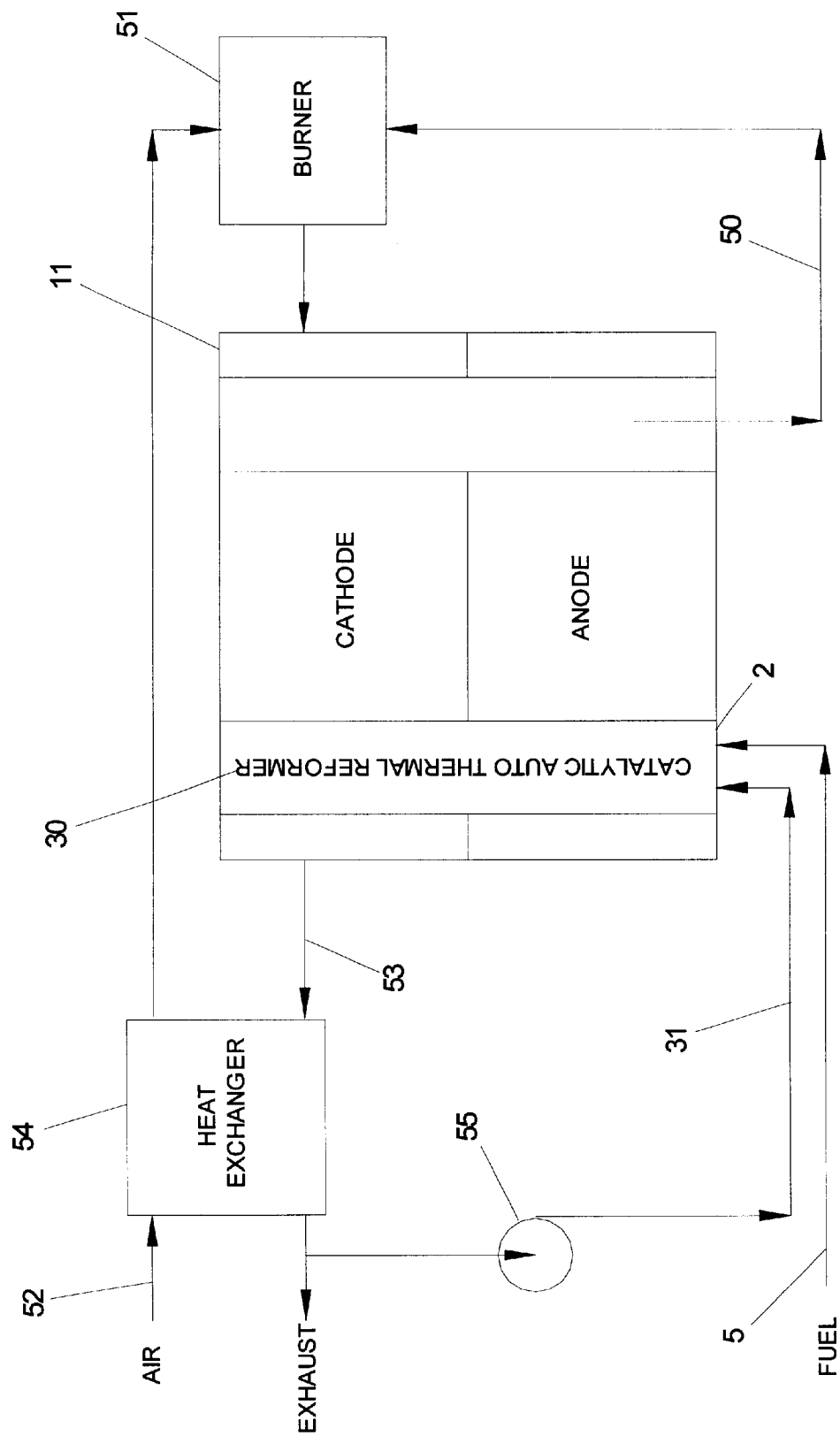
FIG. 5 illustrates a schematic flow diagram of a fuel cell utilizing the present invention.

FIG. 5 illustrates a schematic flow diagram for an MCFC system utilizing the catalyzed auto thermal reforming wand 30 within the manifold chamber 10 of a fuel cell stack 11. Wand 30 receives fuel gas 5 and oxidant 31, with oxidant 31 being introduced via blower 55. A CATR reaction within wand 30 reforms the fuel gas 5. The product of the CATR reaction is introduced to the anode, where it is oxidized to release electrons. Spent fuel 50 is directed to a burner 51, where it is combusted with air 52. The product of the burner 51 is introduced to the cathode, where it is reduced to receive electrons. The spent oxidant 53 is directed to the heat exchanger 54 where heat is transferred to incoming air 52, and entrained electrolyte vapor precipitates out of spent oxidant 55. The oxidant 31 exiting heat exchanger 54 is then introduced via blower 55 to manifold chamber 10 as described above. In other preferred embodiments, the source of oxidant 31 may be air 52.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

I claim:

1. An apparatus for auto thermal reforming hydrocarbon fuel in a fuel cell stack comprising, in combination:
    a plurality of fuel cells stacked together, each fuel cell having an inlet manifold, the inlet manifolds of the fuel cells being aligned with one another to form a manifold chamber;
    a porous wand positioned within the manifold chamber;
    a mixing device positioned within the wand and configured to carry a fuel gas and an oxidant into the wand as a mixture.

2. The apparatus of claim 1, further comprising a catalyst deposited on the porous wand to promote reforming of a fuel gas.

3. The apparatus of claim 1, wherein the wand has a cylindrical tubular shape.

4. The apparatus of claim 1, wherein the wand is formed of a non-conductive material.

5. The apparatus of claim 1, wherein the wand is formed of a ceramic.

6. The apparatus of claim 1, wherein the wand is formed of ceramic alumina.

7. The apparatus of claim 1, wherein the mixing device has a first passage configured to carry a fuel gas and a second passage configured to carry an oxidant.

8. The apparatus of claim 1, wherein the mixing device comprises a tubular member having an internal wall defining a first passage configured to carry a fuel gas and a second passage configured to carry an oxidant.

9. The apparatus of claim 8, wherein the mixing device further includes a plurality of orifices configured to provide fluid communication between the first passage and an exterior of the mixing device and between the second passage and an exterior of the mixing device.

10. The apparatus of claim 2, wherein the catalyst is platinum.

11. The apparatus of claim 2, wherein the catalyst is palladium.

12. The apparatus of claim 2, wherein the catalyst is ruthenium.

13. The apparatus of claim 2, wherein the catalyst is nickel.

14. An apparatus for reforming hydrocarbon fuel in a fuel cell stack comprising, in combination:
    a plurality of fuel cells stacked together, each fuel cell comprising a bipolar separator plate having an inlet manifold and an outlet manifold, the inlet manifolds of the fuel cells in the stack being aligned with one another to form a manifold chamber;
    a tubular porous wand positioned in the manifold chamber;
    a mixing device positioned within the wand and having a first passageway configured to carry a fuel gas and a second passageway configured to carry an oxidant; and
    a catalyst deposited on the porous wand to promote auto thermal reforming of a fuel gas.

15. The apparatus of claim 14, wherein the mixing device further includes a plurality of orifices to provide fluid communication from the first passageway to an exterior of the mixing device and from the second passageway to an exterior of the mixing device.

16. The apparatus of claim 14, wherein the mixing device comprises a tubular member having an internal wall defining a first passage configured to carry a fuel gas and a second passage configured to carry an oxidant.

17. The apparatus of claim 14, wherein the wand is formed of ceramic alumina.

18. The apparatus of claim 14, wherein the catalyst is platinum.

19. The apparatus of claim 14, wherein the catalyst is palladium.

20. The apparatus of claim 14, wherein the catalyst is ruthenium.

21. The apparatus of claim 14, wherein the catalyst is nickel.

22. An apparatus for reforming hydrocarbon fuel in a fuel cell stack comprising, in combination:
    a plurality of fuel cells stacked together, each fuel cell comprising an anode electrode, a cathode electrode, an electrolyte matrix, and a bipolar separator plate having an inlet manifold and an outlet manifold, the inlet manifolds of the fuel cells in the stack being aligned with one another to form a manifold chamber;
    a tubular porous wand positioned in the manifold chamber;
    a mixing device comprising a tubular member having an internal wall defining a first passage configured to carry a fuel gas and a second passage configured to carry an oxidant; and
    a catalyst deposited on the porous wand to promote auto thermal reforming of a fuel gas.

* * * * *